United States Patent [19]
Allen

[11] Patent Number: 5,319,803
[45] Date of Patent: Jun. 7, 1994

[54] STEERING WHEEL ASSEMBLY WITH COMMUNICATION KEYBOARD

[76] Inventor: Dillis V. Allen, 1080 Nerge Rd., Suite 205, Elk Grove Village, Ill. 60007

[21] Appl. No.: 702,188

[22] Filed: May 20, 1991

[51] Int. Cl.⁵ .............................................. H04B 1/38
[52] U.S. Cl. ......................................... 455/89; 455/90; 455/345
[58] Field of Search ................ 455/89, 90, 345, 99, 455/347, 351; 379/430, 446, 454, 455; 381/86; 280/777–779; 224/276; 74/492

[56] References Cited

U.S. PATENT DOCUMENTS

| | | | |
|---|---|---|---|
| 1,289,978 | 12/1918 | Ward | 224/276 |
| 1,432,015 | 10/1922 | Burnett | 224/276 |
| 1,892,721 | 1/1933 | Cardarelli | 224/276 |
| 2,710,686 | 8/1953 | Trammell, Jr. | 224/276 |
| 4,455,454 | 6/1984 | Umebayashi | 455/89 |
| 4,698,838 | 10/1987 | Ishikawa et al. | 455/90 |
| 4,917,130 | 4/1990 | Sweder | 224/276 |
| 5,086,510 | 2/1992 | Guenther et al. | 455/345 |

Primary Examiner—Reinhard J. Eisenzopf
Assistant Examiner—Nguyen Vo

[57] ABSTRACT

A telephone keyboard and display assembly for a vehicle steering wheel assembly designed to be mounted generally radially downwardly between a steering wheel base and the hand grip ring. The telephone is sufficiently narrow so the operator's fingers may freely pass around the hand grip ring on either side and the phone is tilted slightly upwardly to improve the operator's vision of the keyboard and display. The upper end of the telephone is supported on the base and its lower end attaches to the hand grip ring.

16 Claims, 5 Drawing Sheets

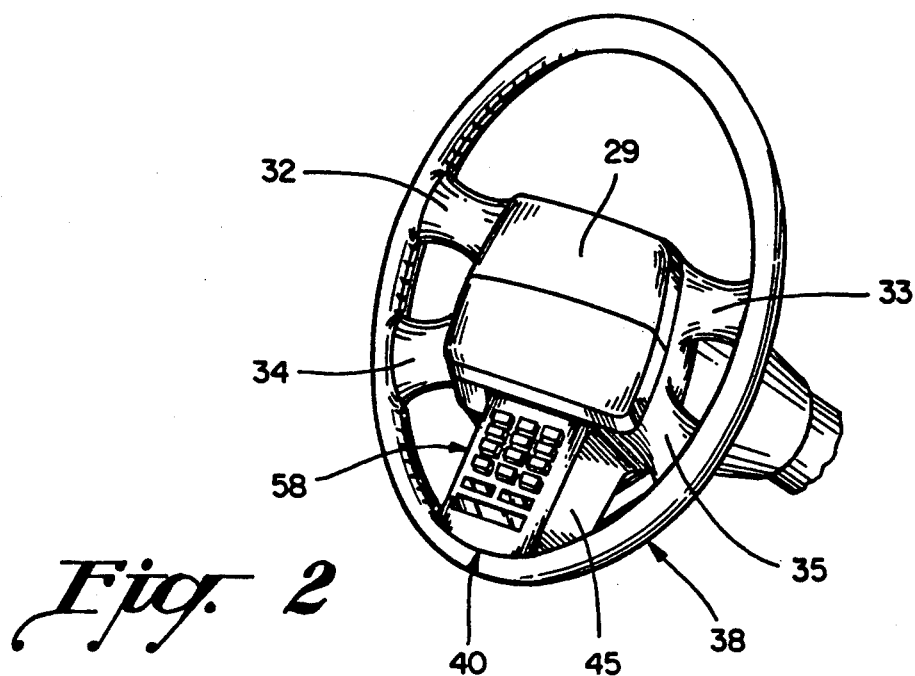
Fig. 2
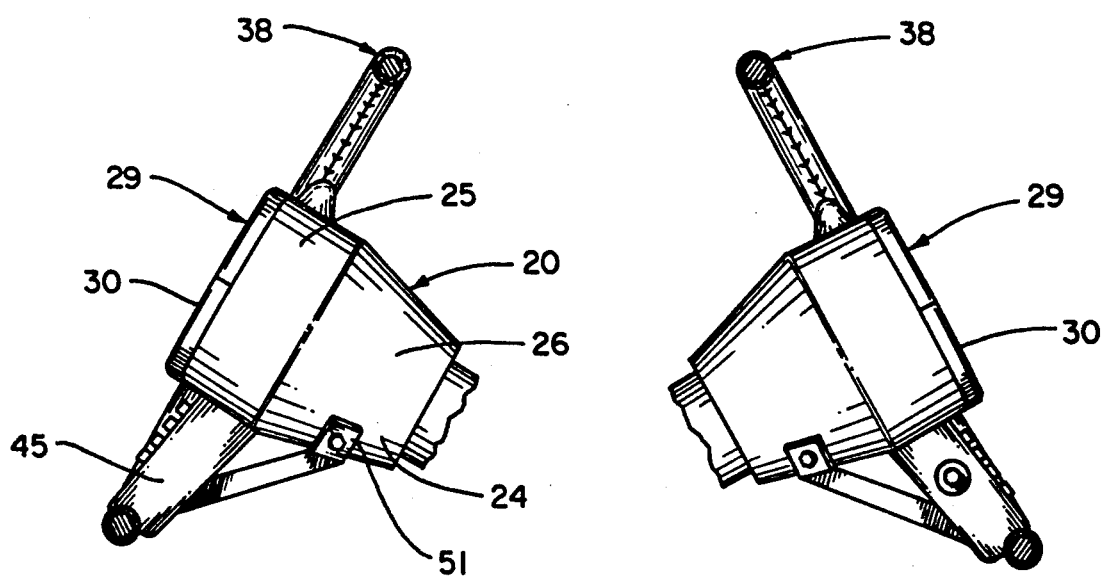
Fig. 3
Fig. 4

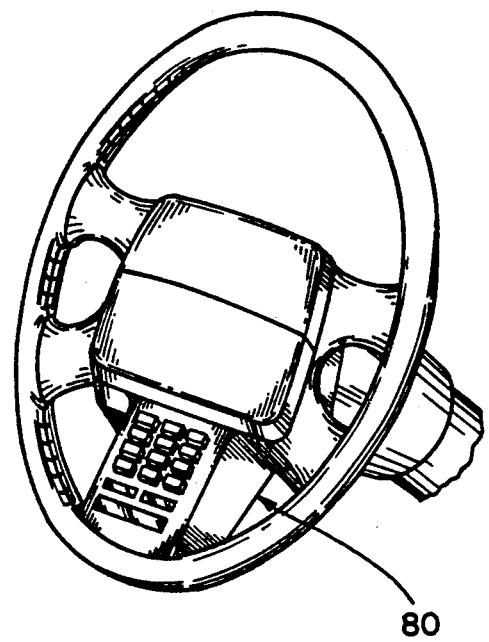
Fig. 8
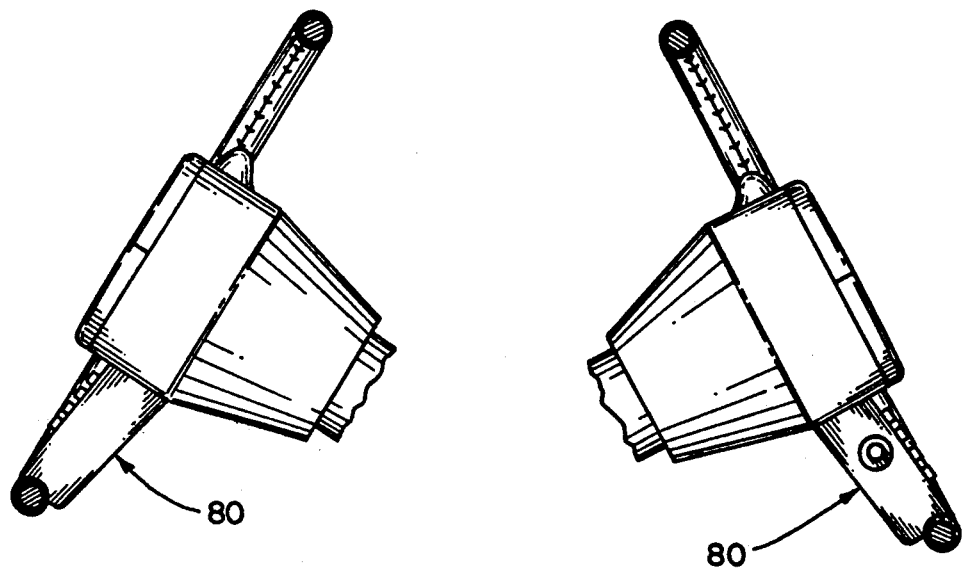
Fig. 9
Fig. 10

STEERING WHEEL ASSEMBLY WITH COMMUNICATION KEYBOARD

BACKGROUND OF THE INVENTION

Car telephones have achieved tremendous success over the last decade due principally to the advent of cellular telephone systems that have vastly increased the market for car telephones because of dramatic cost reductions over prior single transmitting and receiving station systems.

Thus far, the design, manufacture and installation of vehicular telephones have principally resided with mobile telephone manufacturers and their downstream marketeers, and they are installed on the vehicle as an after-market item as opposed to being installed as an original equipment option on the vehicle by the vehicle manufacturer. There are, however, presently several automobile manufacturers that offer an on-board telephone system as an original equipment item but thus far most original equipment manufacturers have been reticent to offer original equipment telephone systems as an option on a wide variety of their vehicles, principally because OEM manufacturers have no present capability in design of telephone systems, their installation, start-up, maintenance and repair, although this posture by the automobile industry appears to be changing.

Presently automobile telephone systems, whether as after-market options or original equipment options, are designed to be mounted on floor mounted pedestals, forward and to the right of the operator's seat, or on the stationary console between the operator's seat and the right front passenger's seat, and there also appears in the marketplace a dashboard mounted telephone.

None of these locations are optimal for telephone systems because they either require the user to hold the telephone handset in hand while making a call or in hand-free systems require the operator take his eyes off the road when dialing numbers for a significant period of time, and both of these situations detract from safe driving, and vehicle accidents resulting from using these types of telephone systems are frequent.

Thus far, the location and design of presently available OEM and after-market telephone systems are not attractive both from a convenience standpoint and from a safety standpoint.

The optimal location for a vehicular telephone keyboard and its associated LCD display is on the vehicle steering wheel assembly because there the keyboard is much closer to the operator eliminating the need for the operator to bend over to dial a floor-mounted hands free phone, eliminates the requirement in some systems for the operator to actually hold the handset, it positions the microphone much closer to the user's mouth so that some improvement in the audio quality results, and as an OEM option can utilize the already in place horn harness for the transmission cable.

There have in the past been several somewhat crude suggestions for steering column mounting telephone systems such as in the Umebayashi, U.S. Pat. No. 4,455,454; the Ishikawa, et. al., U.S. Pat. No. 4,698,838; the Kamei, et. al., U.S. Pat. No. 4,723,265; the Suzuki, et. al., U.S. Pat. No. 4,847,887, and the Martin, U.S. Pat. No. 4,850,015. In the Umebayashi patent, for example, a rather complex mechanism is provided for maintaining the telephone keyboard stationary as the wheel is turned, but since operation of the keyboard while the wheel is turning is not recommended from either a safety standpoint in either case, this system has found no commercial success.

The principal reason why these prior steering wheel mounted telephone assemblies have found no commercial success is the present day requirement for operator safety restraint systems which are optimally located on the steering wheel base, and these usually are air-inflatable systems. These safety restraint systems are energized by forward to rear violent deceleration sensing systems and effect air bag inflation very rapidly, on the order of 15 milliseconds, and the inflating air bag when released, impacts not only the operator's body but the operator's face and head area as well. The safety restraint system, when packed on the steering wheel assembly base, is covered by a flexible relatively soft synthetic material that must be designed to cause minimum human abrading upon release of the safety restraint system.

For this reason, prior suggestions for mounting the telephone keyboard and display approximately centrally on the steering wheel base are unacceptable because they would present a safety hazard upon operation of the safety restraint system.

In short, prior telephone systems designed for vehicular location while achieving considerable commercial success nevertheless are not optimally designed because of (a) poor keyboard visibility, (b) difficult to reach hands free keyboards, (c) obstruction of vision of other instrumentation, (d) operator and vehicle human safety problem, (e) interference with safety restraint systems, (f) difficult removal for repair, (g) unstable mountings, and (h) the requirement for separate new wiring harnesses.

It is a primary object of the present invention to ameliorate the problems described above in vehicle carried telephone keyboard displaying microphone systems.

SUMMARY OF THE PRESENT INVENTION

In accordance with the present invention, an optimal telephone keyboard, microphone and LCD display assembly is provided carried by the vehicle steering assembly and designed to be mounted generally radially and downwardly between the steering wheel base and the wheel hand grip outer ring. It is sufficiently narrow so the operator may grasp the hand grip on either side of the phone so the phone does not inhibit steering wheel operation any more than an additional vertical lower strut would which, of course, has been common in the past. The phone is tilted upwardly from the plane of the hand grip ring to improve the operator's vision of the keyboard and display. The upper end of the phone is supported on the steering wheel base and its lower end is designed to attach to or reset on the hand grip ring so the phone is securely mounted at both ends without any cantilevering.

This phone configuration improves operator visibility of the alpha numeric information on the keyboard because it is much closer to the operator's eyes than in prior systems. This location offers improved vehicle operation safety because it requires only a small movement of the user's eyes from the windshield during dialing, and it also is safer because it eliminates any necessity for the operator to use one hand to hold a telephone handset as in many prior systems.

The location of the phone keyboard beneath the safety restraint system on the wheel base not only eliminates the problem of safety restraint system interference but also has no affect on operator's vision of other instrumentation through the steering wheel assembly because such is almost always above the safety restraint system.

Another advantage is that the present phone does not interfere with air bag actuation nor does it present any safety problem upon inflation of the air bag.

Other objects and advantages of the present invention will appear more clearly from the following detailed description.

BRIEF DESCRIPTION OF THE DRAWINGS

FIG. 2 is a perspective view of the steering wheel sub-assembly illustrated in FIG. 1 with the parts thereof in their assembled positions;

FIG. 3 is a partly fragmentary right side view of the steering wheel assembly illustrated in FIG. 2;

FIG. 4 is a partly fragmentary left side view of the steering wheel assembly illustrated in FIG. 2;

FIG. 8 is a perspective view of a steering wheel assembly according to the present invention but in somewhat modified form;

FIG. 9 is a partly fragmentary right side view of the steering wheel assembly illustrated in FIG. 8;

FIG. 10 is a partly fragmentary left side view of the steering wheel assembly illustrated in FIGS. 8 and 9;

RELATED APPLICATIONS

This application is related to my copending design applications, all entitled STEERING WHEEL ASSEMBLY WITH COMMUNICATION KEYBOARD, U.S. application Ser. No. 702,690, Filed: May 20, 1991, U.S. application Ser. No. 702,695, Filed: May 20, 1991, U.S. application Ser. No. 702,713, Filed: May 20, 1991, U.S. application Ser. No. 702,717, Filed: May 20, 1991, U.S. application Ser. No. 702,718, Filed: May 20, 1991, U.S. application Ser. No. 702,689, Filed: May 20, 1991, and U.S. application Ser. No. 702,688, Filed: May 20, 1991. These design applications are intended to and do cover the physical appearance of several steering wheel assemblies carrying telephone keyboards and not the functions of the keyboard, while the present application is not directed to the aesthetics of the telephone system but rather the functions of the system.

DETAILED DESCRIPTION OF THE PREFERRED EMBODIMENTS

It should be understood that the present keyboard microphone and display assembly is embodied as a component in a telephone system. It should also be understood that its principles could be applied to other data inputting keyboards and displays such as a computer keyboard and small monitor. In either case the present invention is particularly useful where there are numerous switches on the keyboard that require a fairly substantial area, thereby limiting the available locations on the steering wheel assembly for such components.

Figure 1:
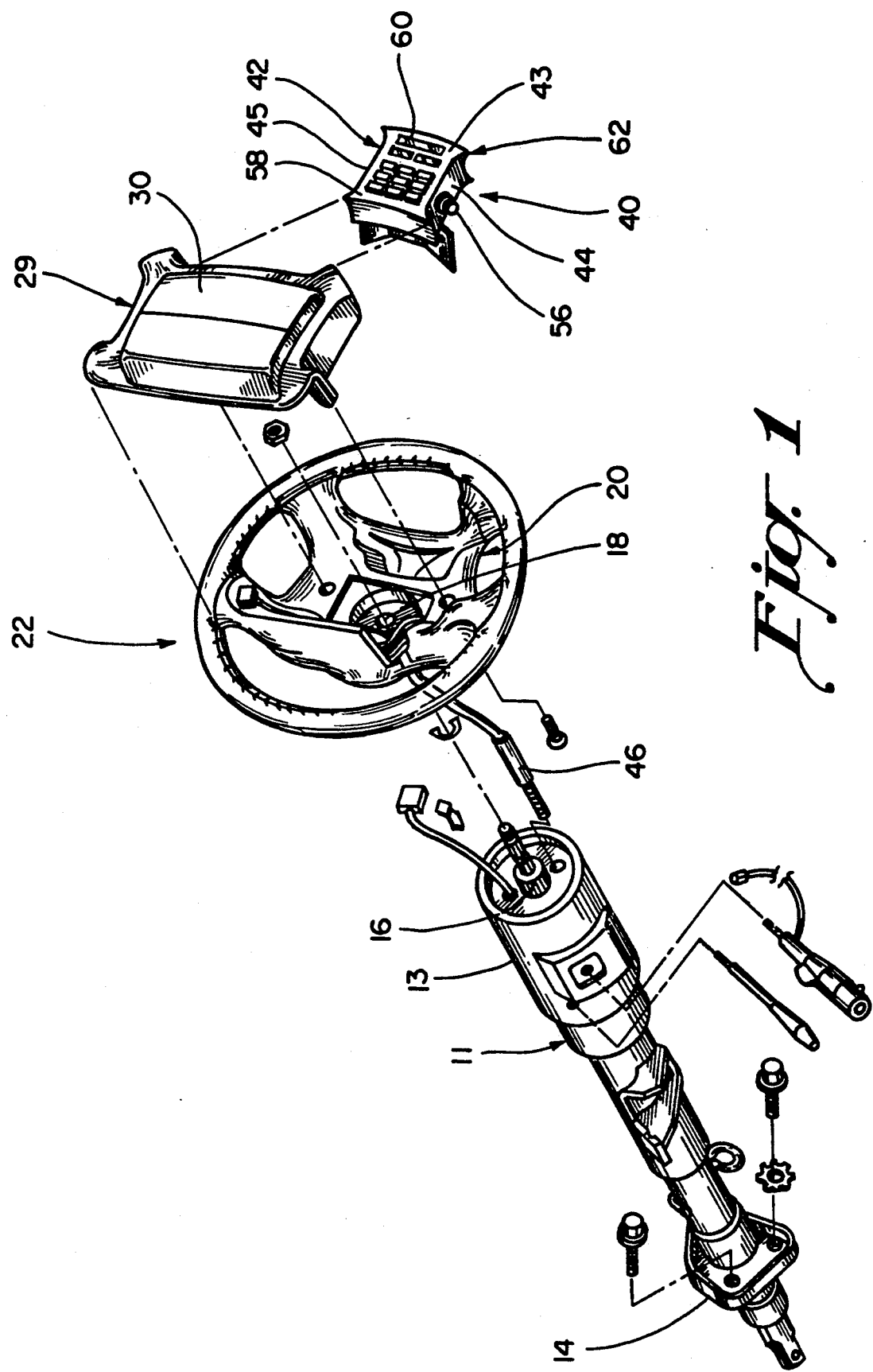
FIG. 1 is an exploded perspective of a steering wheel and column assembly with the present telephone keyboard, microphone and display assembly.
Figure 5:
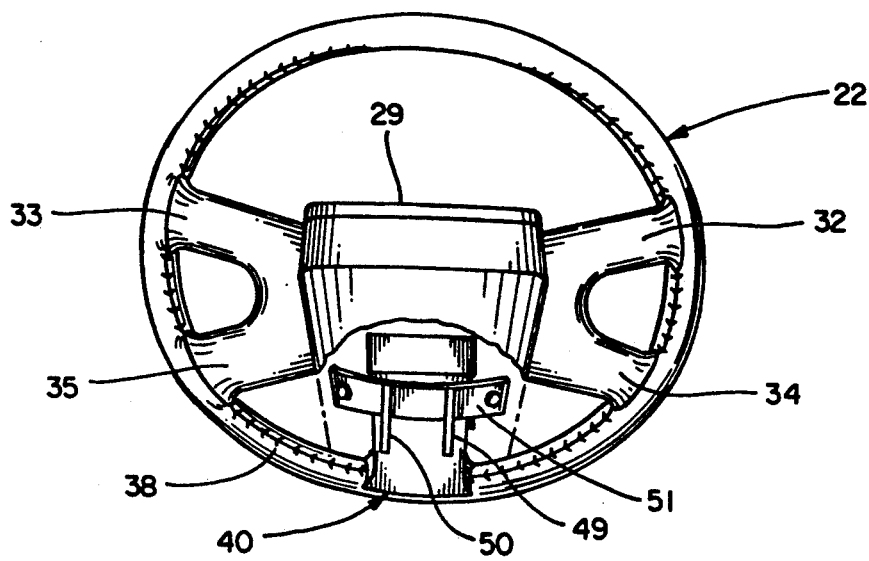
FIG. 5 is a partly fragmentary rear view of the steering wheel assembly illustrated in FIGS. 2 to 4.

Referring to the drawings and initially FIG. 1, a steering column assembly 10 is illustrated generally including a lower column assembly 11 having a stepped stationary outer housing 13 fixed to the vehicle fire wall by a mounting flange 14. Housing 13 has bearings supporting a rotatable steering shaft 16 that is splined to non-rotationally engage and be driven by a splined steering wheel bore 18 in a base 20 on steering wheel assembly 22.

As seen more clearly in FIGS. 2 to 7, the steering wheel assembly base 20 has a somewhat resilient synthetic cover 24 having a generally rectangular upper portion 25 and a downwardly converging similarly shaped portion 26 integral therewith. The base 20 rotates on the upper stationary column housing 13.

The base 20 carries a generally rectangular safety restraint system 29 not shown in any detail in the drawings except for its cover 30, which is a relatively soft synthetic material on the order of 70 Shore A durometer. When the safety restraint system 29 is activated, cover 30 tops off the steering wheel assembly 22 so that cover 30 must be free from protrusions and projections that might harm the driver or other passengers in the vehicle.

As seen somewhat more clearly in FIG. 2, the steering wheel assembly base 20 has upper outwardly extending struts 32 and 33 and lower outwardly extending struts 34 and 35 all extending generally radially outwardly and horizontally from the base 20. It should be understood that the present invention is equally applicable to steering wheel assemblies having a single pair of outwardly extending struts rather than the two pairs illustrated in the present drawings.

A leather wrapped hand grip ring 38 is supported on the struts 32, 33, 34 and 35 in conventional fashion.

According to the present invention, a telephone keyboard, microphone and display assembly 40 is provided mounted at its upper end of the base 20 and at its lower end on the steering wheel hand grip ring 38 so that it is securely mounted at both ends and at the same time easily removable from the steering wheel assembly 22 for repair.

Telephone assembly 40 is generally rectangular in configuration with a generally square housing 42 having a keyboard base 43 also generally rectangular and parallel, spaced side walls 44 and 45 that are sufficiently close together so that there remains significant unobstructed areas between both sides of the phone assembly 40 and the struts 34 and 35 for the operator to grasp the hand grip ring 38 without interference. As seen in FIGS. 3 and 4, the side walls 44 and 45 of the housing 42 have a depth significantly less than the spacing between side walls 44 and 45.

Viewing FIG. 1, the telephone transmission cable is part of the otherwise standard wiring harness 46 for the steering assembly 22.

Figure 6:
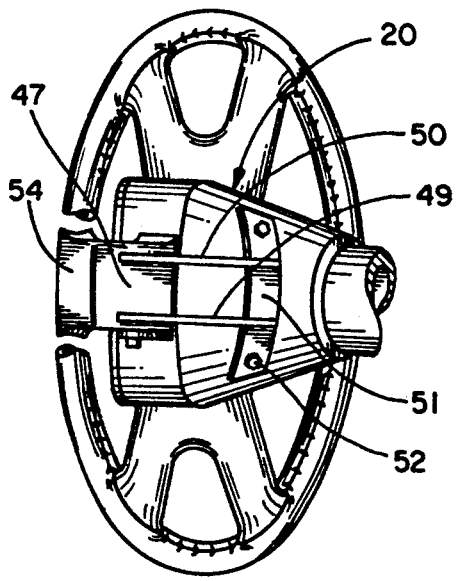
FIG. 6 is a partly fragmentary bottom view of the steering wheel assembly illustrated in FIGS. 2 to 5.
Figure 7:
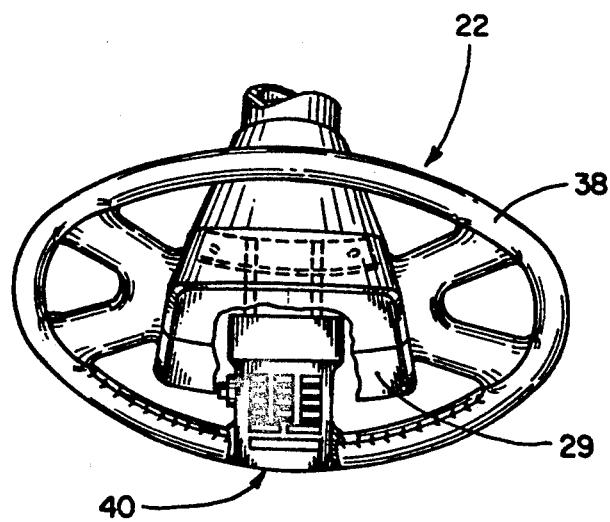
FIG. 7 is a partly fragmentary top view of the steering wheel assembly illustrated in FIGS. 2 to 6.
Figure 11:
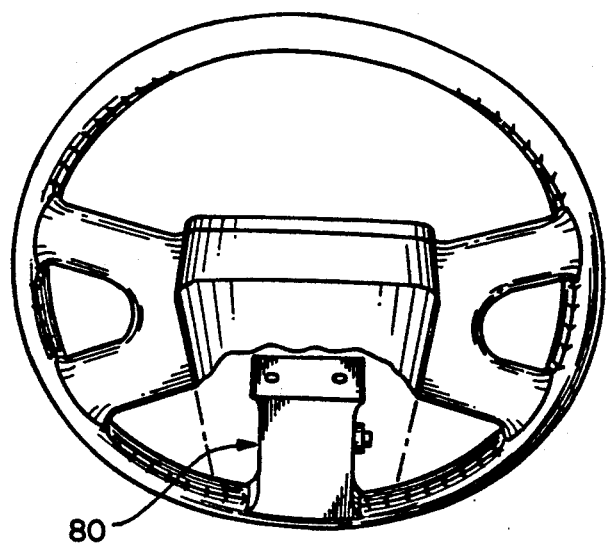
FIG. 11 is a partly fragmentary rear view of the steering wheel assembly illustrated in FIGS. 8 to 10.
Figure 12:
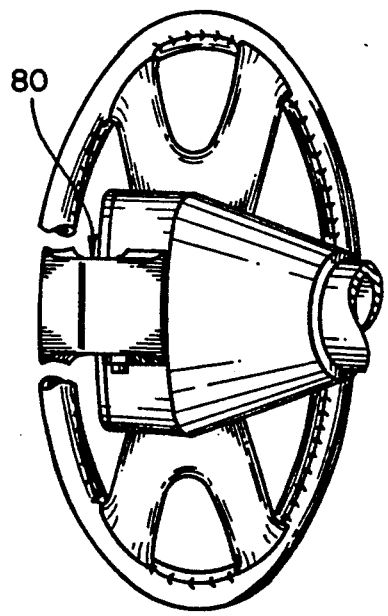
FIG. 12 is a partly fragmentary bottom view of the steering wheel assembly illustrated in FIGS. 8 to 11.
Figure 13:
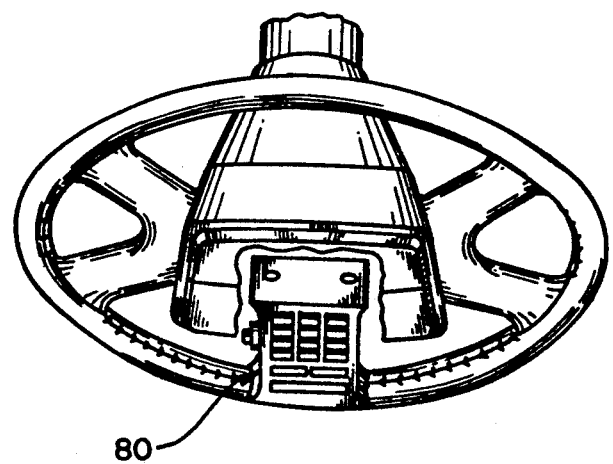
FIG. 13 is a partly fragmentary top view of the steering wheel assembly illustrated in FIGS. 8 to 12.

As seen more clearly in FIGS. 3, 4 and 6, the telephone housing 42 has a rear wall 47 that has formed integrally therewith a pair of bracket stand-offs 49 and 50 that have an arcuate bracket 51 integrally formed at the upper ends thereof that receives fasteners 52 for fastening and supporting the assembly 40 on the steering wheel assembly base 20.

As seen in FIG. 6, housing 42 also has a bottom wall 54 that is arcuate in both orthogonal directions as also seen in FIGS. 3 and 4 so that it fits around and conforms to the curvature of the steering wheel ring 38.

The phone assembly 40 illustrated in FIGS. 1 to 7, while useable as an original equipment option, can also be marketed as an after-market option because it has the capability of adapting to somewhat different sized steering wheel assemblies by the appropriate location of the holes for the fasteners 52 by the after-market installer.

The telephone assembly housing 42 contains conventional switching and other circuitry necessary for transmitting digital phone information to a remotely mounted receiver/transmitter in the vehicle, as well as ancillary circuitry such as number storage, redial, call waiting, and LCD driving circuitry.

A main function switch 56 is carried on housing side wall 44 and is used in conjunction with certain keys on keyboard base 43 to select a plurality of different conventional functions. A keyboard 58 is carried on keyboard wall 43 and has a plurality of rows of manually depressable keys, in this case four rows. Base 43 also carries an LCD alphanumeric display 60 at its lower end where it is easier to read without obstruction by the safety restraint system 20. As seen in FIGS. 3 and 4, the telephone assembly 40 is positioned by bracket 51 so it is tilted somewhat upwardly from the plane of the hand grip ring 38 to improve operator vision of the keyboard 58 and the display 60.

The keyboard wall 43 has microphone apertures 62 which are positioned immediately above the telephone transmitting microphone in the phone assembly 40.

A somewhat modified form of the present invention is illustrated in FIGS. 8 to 13 and includes a telephone keyboard, microphone and LCD display 80 that is substantially the same as that disclosed in FIGS. 2 to 7 except particularly designed for original equipment installation into the vehicle because it does not have the adjustability characteristics provided by bracket 51 in the FIGS. 2 to 7 embodiments.

I claim:

1. A communication keyboard for a vehicular steering column assembly having a stationary column housing assembly and a steering wheel assembly rotatably mounted on the stationary column housing where the steering wheel assembly includes an outer arcuate handgrip supported by lateral struts on a column housing mounted base with a releasable body safety restraint system carried approximately centrally on the base, comprising: a keyboard housing fixed to and rotatable with the steering wheel assembly separate and spaced from the lateral struts constructed to be mounted between and below the safety restraint system and the arcuate hand grip, said struts extending generally horizontally outwardly from the steering assembly base to the arcuate hand grip, said keyboard housing having left and right sides spaced from the struts permitting the driver's fingers to grasp the hand grip between the struts and the keyboard housing and utilize the keyboard housing as an additional strut for steering wheel assembly turning, a plurality of function transmission components in the column housing for transmitting data from the keyboard housing to receiving components mounted in the associated vehicle, said keyboard housing having a substantial width and at least three vertical rows of manually depressible switches totaling at least ten for inputting information to the function transmission components, so that the substantial width keyboard housing does not obstruct the driver's vision of other instrumentation in control panel of the vehicle dashboard areas.

2. A communication keyboard for a vehicular steering column assembly as defined in claim 1, wherein the keyboard housing is supported at its upper end on the steering wheel assembly base.

3. A communication keyboard for vehicular steering column assembly as defined in claim 2, wherein the keyboard housing is supported at its lower end on the hand grip.

4. A communication keyboard for a vehicular steering column assembly as defined in claim 1, wherein the communication keyboard is a telephone component.

5. A steering wheel assembly for a steering column having an outer stationary column housing assembly, comprising: a steering assembly base rotatably mounted on the stationary column housing assembly, an arcuate hand grip supported by lateral struts extending outwardly from the base, a releasable safety restraint system mounted approximately centrally on the base, and a communication keyboard fixed to and rotatable with the steering wheel assembly separate and spaced from the lateral struts extending between the safety restraint system and the hand grip below the safety restraint system including a keyboard housing, a plurality of function transmission components in the column housing for transmitting data from the keyboard to receiving components in the vehicle, said struts extending generally horizontally outwardly from the steering assembly base to the arcuate hand grip, said keyboard having left and right sides spaced from the struts permitting the driver's fingers to grasp the hand grip between the struts and the keyboard and utilize the keyboard housing as an additional strut for steering wheel turning, said keyboard having a substantial width and at least three rows of manually depressible switches totaling at least ten for inputting information to the function transmission components, so that the substantial width keyboard housing does not obstruct the driver's vision of other instrumentation in control panel of the vehicle dashboard area.

6. A steering wheel assembly for a steering column as defined in claim 5, wherein the keyboard is supported at its upper end in the steering wheel assembly base.

7. A steering wheel assembly for a steering column as defined in claim 6, wherein the keyboard housing is supported at its lower end on the hand grip.

8. A steering wheel assembly for a steering column as defined in claim 5, wherein the communication keyboard is a telephone component.

9. A communication keyboard for a vehicular steering column assembly having a stationary column housing assembly and a steering wheel assembly rotatably mounted on the stationary column housing assembly where the steering wheel assembly includes an outer arcuate hand-grip supported by lateral struts on a column housing mounted base with a releasable body safety restraint system carried approximately centrally on the base, comprising: a keyboard housing fixed to and rotatable with the steering wheel assembly separate and spaced from the lateral struts constructed to be mounted between and below the safety restraint system and the arcuate hand grip, said keyboard housing being mounted generally vertically, and centrally and below center with respect to the steering wheel assembly, said keyboard housing being connected at its upper end to the steering wheel assembly base and at its lower end to the arcuate hand grip, said struts extending generally horizontally outwardly from the steering assembly base to the arcuate hand grip, said keyboard housing having left and right sides spaced from the struts permitting the driver's fingers to grasp the hand grip between the struts and the keyboard housing and utilize the keyboard housing as an additional strut for steering wheel assembly turning, a plurality of function transmission components in the column housing assembly for transmitting data from the keyboard to receiving components mounted in the associated vehicle, said keyboard housing having a substantial width and at least three vertical rows of manually depressible switches totaling at least ten for inputting information to the function transmission components, so that the substantial width keyboard housing does not obstruct the driver's vision of other instrumentation in control panel of the vehicle dashboard area.

10. A steering wheel assembly for a steering wheel column having an outer stationary column housing assembly, comprising: a steering assembly base rotatably mounted on the stationary column housing assembly, an arcuate hand grip supported by lateral struts extending outwardly from the base, a releasable safety restraint system mounted approximately centrally on the base, and a communication keyboard fixed to and rotatable with the steering assembly separate and spaced from the lateral struts extending between the safety restraint system and the hand grip below an upper end of the safety restraint system including a housing, said keyboard housing being mounted generally vertically, and below center with respect to the steering wheel assembly, said keyboard housing being connected at its upper end to the steering wheel assembly base and at its lower end to the arcuate hand grip, a plurality of function transmission components in the column housing for transmitting data from the keyboard to receiving components in the vehicle, said keyboard having a substantial width and at least three vertical rows of manually depressible switches totaling at least ten for inputting information to the function transmission components, said struts extending generally horizontally outwardly from the steering assembly base to the arcuate hand grip, said keyboard housing having left and right sides spaced from the struts permitting the driver's fingers to grasp the hand grip between the struts and the keyboard housing and utilize the keyboard housing as an additional strut for steering wheel assembly turning, so that the substantial width keyboard housing does not obstruct the driver's vision of other instrumentation in control panel of the vehicle dashboard area.

11. A steering wheel assembly for a steering column having an outer stationary column housing assembly, comprising: a steering assembly base rotatably mounted on the stationary column housing assembly, an arcuate hand grip supported by struts extending outwardly from the base, a releaseable safety restraint system mounted approximately centrally on the base, and a communication keyboard fixed to and rotatable with the steering wheel assembly separate and spaced from the lateral struts extending between the safety restraint system and the hand grip below an upper end of the safety restraint system including a housing, a plurality of function transmission components in the column housing assembly for transmitting data from the keyboard to receiving components in the vehicle, said keyboard having a substantial width and at least three vertical rows of manually depressible switches totaling at least ten on the keyboard housing for inputting information to the function transmission components, said struts extending generally horizontally outwardly from the steering assembly base to the arcuate hand grip, said keyboard housing having left and right sides spaced from the struts permitting the driver's fingers to grasp the hand grip between the struts and the keyboard housing, said keyboard housing being circumferentially spaced from the struts, so that the substantial width keyboard housing does not obstruct the driver's vision of other instrumentation in control panel of the vehicle dashboard area.

12. A steering wheel assembly for a steering column having an outer stationary column housing assembly as defined in claim 11, wherein the arcuate hand grip lies in a grip plane, said keyboard housing lying in a plane rotated clockwise from the grip plane when viewed from the right side of the steering wheel assembly to improve operator vision of the keyboard switches.

13. A telephone keyboard and display assembly for a steering wheel assembly having a base carrying a safety restraint system approximately centrally thereon and struts extending generally horizontally radially outwardly to an arcuate hand grip, comprising: a generally rectangular keyboard housing, a bracket extending generally upwardly from the housing having a support surface engageable with the steering wheel assembly base, fastener means for connecting the bracket to the base so the housing rotates with the steering wheel assembly, said bracket constructed to position the keyboard housing below the base and the safety restraint system and it extend generally radially downwardly with respect to the base, said housing having a width less than the safety restraint system permitting the operator's fingers to grasp the hand grip between the struts and the keyboard housing, said struts extending generally horizontally outwardly from the steering assembly base to the arcuate hand grip, said keyboard housing having a substantial width and left and right sides spaced from the struts, telephone function components in the housing, said keyboard having at least three rows of manually depressible switches totaling at least ten on the top of the housing, and a display adjacent the switches, so that the substantial width keyboard housing does not obstruct the driver's vision of other instrumentation in control panel of the vehicle dashboard area.

14. A telephone keyboard and display assembly for a steering wheel assembly as defined in claim 13, including hand grip engaging means on the lower end of the housing so the telephone assembly is supported in part directly on the hand grip.

15. A telephone keyboard and display assembly for a steering wheel assembly as defined in claim 13, wherein the bracket positions the keyboard in a plane tilted about a horizontal axis from a plane containing the arcuate hand grip for easier operator viewing.

16. A steering wheel assembly having a telephone keyboard and display carried thereby, comprising a base, a safety restraint system carried approximately centrally on the base, a pair of struts extending generally horizontally and radially outwardly from the base, an arcuate hand grip supported on the struts, a generally rectangular keyboard housing, a bracket extending generally upwardly from the housing having a support surface engageable with the steering wheel assembly base so the housing rotates with the steering wheel assembly, fastener means for connecting the bracket to the base, said bracket constructed to position the housing below the base and the safety restraint system extending generally radially downwardly with respect to the base, said housing having a width less than the safety restraint system permitting the operator's fingers to grasp the hand grip between the struts and the keyboard housing, telephone function components in the housing, said keyboard housing having a substantial width and at least three vertical rows of manually depressible switches totaling at least ten on the top of the housing, and a display adjacent the switches, so that the substantial width keyboard housing does not obstruct the driver's vision of other instrumentation in control panel of the vehicle dashboard area.

* * * * *